(12) United States Patent
Yamaguchi et al.

(10) Patent No.: US 8,358,807 B2
(45) Date of Patent: Jan. 22, 2013

(54) IMAGE-DATA-DISTRIBUTION-MODEL UPDATING APPARATUS, IMAGE PROCESSING APPARATUS, IMAGE-DATA-DISTRIBUTION-MODEL UPDATING METHOD, AND COMPUTER PROGRAM

(75) Inventors: Kazunori Yamaguchi, Tokyo (JP); Koichiro Seo, Kanagawa (JP)

(73) Assignee: Sony Corporation, Tokyo (JP)

( * ) Notice: Subject to any disclaimer, the term of this patent is extended or adjusted under 35 U.S.C. 154(b) by 693 days.

(21) Appl. No.: 12/458,566

(22) Filed: Jul. 16, 2009

(65) Prior Publication Data

US 2010/0027880 A1 Feb. 4, 2010

(30) Foreign Application Priority Data

Jul. 29, 2008 (JP) ................. 2008-194264

(51) Int. Cl.
*G06K 9/00* (2006.01)
(52) U.S. Cl. ........................................ 382/103
(58) Field of Classification Search .................. 382/103, 382/155, 162, 190, 254; 348/169; 702/179, 702/181; 345/589
See application file for complete search history.

(56) References Cited

U.S. PATENT DOCUMENTS

| 2006/0268128 | A1 | 11/2006 | Miwa | |
|---|---|---|---|---|
| 2006/0285747 | A1* | 12/2006 | Blake et al. | 382/180 |
| 2007/0003106 | A1* | 1/2007 | Kim et al. | 382/103 |
| 2007/0206865 | A1* | 9/2007 | Boregowda et al. | 382/225 |
| 2007/0237393 | A1* | 10/2007 | Zhang et al. | 382/173 |
| 2009/0116698 | A1* | 5/2009 | Zhang et al. | 382/111 |
| 2009/0147991 | A1* | 6/2009 | Chau | 382/103 |
| 2010/0008573 | A1* | 1/2010 | Tajbakhsh et al. | 382/167 |

FOREIGN PATENT DOCUMENTS

| JP | 2004-348732 A | 12/2004 |
|---|---|---|
| JP | 2006-331306 | 12/2006 |

OTHER PUBLICATIONS

Japanese Office Action issued Jul. 7, 2012 for corresponding Japanese Application No. 2008-194264.
Shimada, Takashi, et al. "Object Detection Under Lighting Condition Variation by Dynamic Background Forecasting Model" Institute of Electronics, Information and Communication Engineers Technical Research Report, PRMU2007-323, Pattern Recognition an Media Understanding, Institute of Electronics, Information and Communication Engineers, and Mar. 3, 2008, vol. 107, No. 539, p. 507-512.

* cited by examiner

*Primary Examiner* — Chan S Park
*Assistant Examiner* — Shervin Nakhjavan
(74) *Attorney, Agent, or Firm* — Rader Fishman & Grauer, PLLC

(57) ABSTRACT

An image-data-distribution-model updating apparatus includes: a determining unit that determines, concerning image data continuous in time series, to which of plural distribution models indicating an average of signal levels for each of plural color components, variance of a signal level distribution of all the plural color components, and reliability of all the plural color components the target image data belongs; and an updating unit that updates the average, the variance, and the reliability of a distribution model having the highest reliability among the distribution models to which it is determined that the target image data belongs and updates the reliability of the other distribution models.

9 Claims, 10 Drawing Sheets

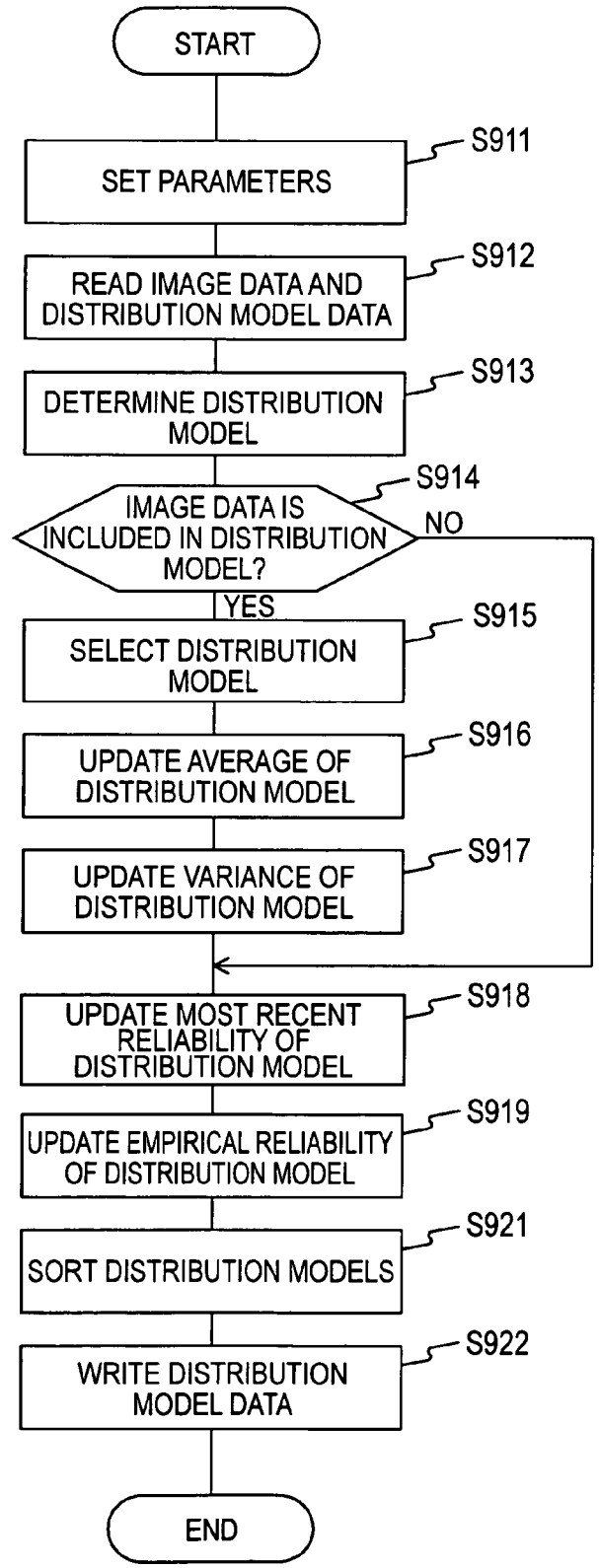

FIG.9

| | |
|---|---|
| NUMBER OF PROCESSING TARGET PIXELS | 510 |
| IMAGE DATA STARTING ADDRESS | 520 |
| DISTRIBUTION MODEL STARTING ADDRESS | 530 |
| DISTRIBUTION MODEL AFTER UPDATE STARTING ADDRESS | 540 |
| IMAGE INPUT OFFSET | 550 |
| DISTRIBUTION MODEL INPUT OFFSET | 560 |
| DISTRIBUTION MODEL OUTPUT OFFSET | 570 |
| DETERMINATION THRESHOLD MODE | 610 |
| RELIABILITY SELECTION MODE | 620 |
| R THRESHOLD OFFSET | 630 |
| G THRESHOLD OFFSET | 640 |
| B THRESHOLD OFFSET | 650 |
| RELIABILITY UPDATE RATE | 710 |
| DISTRIBUTION MODEL UPDATE MODE | 720 |
| DIFFERENCE VALUE SCALING FACTOR | 730 |
| VARIANCE INITIAL VALUE | 740 |
| WEIGHT INITIAL VALUE | 750 |

IMAGE-DATA-DISTRIBUTION-MODEL UPDATING APPARATUS, IMAGE PROCESSING APPARATUS, IMAGE-DATA-DISTRIBUTION-MODEL UPDATING METHOD, AND COMPUTER PROGRAM

BACKGROUND OF THE INVENTION

1. Field of the Invention

The present invention relates to an image processing apparatus, and, more particularly to an image processing apparatus that updates a distribution model and detects a movable body and an immovable body in image data on the basis of the distribution model, an image-data-distribution-model updating apparatus, a processing method in the image processing apparatus and the image-data-distribution-model updating apparatus, and a computer program for causing a computer to execute the method.

2. Description of the Related Art

There are proposed a technique for detecting an object that is added to image data anew and comes to a standstill or an object that disappears from the image data (these objects are hereinafter referred to as immovable bodies) and a technique for detecting or tracking movable bodies that move in image data. As a technique for performing, for example, detection of the movable bodies and the immovable bodies, Gaussian Mixture Modeling (GMM) is known. The Gaussian Mixture Modeling is a technique for mixing and modeling plural Gaussian distributions. In the Gaussian Mixture Modeling, an n-ary distribution model is generated from image data and sequentially updated. It is possible to perform, for example, detection of a movable body and an immovable body by using an average and the weight of the n-ary distribution model (e.g., in a binary distribution model, a "distribution model of k=0" and a "distribution model of k=1").

In general, a probability $P(X_t)$ of a pixel at time t having luminance $X_t$ is represented by the following formula.

$$P(X_t) = \sum_{i=1}^{k} w_{i,t} \times \eta(X_t, \mu_{i,t}, \Sigma_{i,t})$$

where, k represents the number of normal distributions, $w_{i,t}$ represents the weight of an ith normal distribution at time t, $\mu_{i,t}$ represents an average of the ith normal distribution at time t, $\Sigma_{i,t}$ represents a covariance of the ith normal distribution at time t, and $\eta$ represents a probability density function. The probability density function $\eta$ represents a normal distribution calculated by the following formula.

$$\eta(X_t, \mu, \Sigma) = \frac{1}{(2\pi)^{\frac{n}{2}} |\Sigma|^{\frac{1}{2}}} e^{-\frac{1}{2}(X_t-\mu_t)^T \Sigma^{-1}(X_t-\mu_t)}$$

A covariance matrix $\Sigma_{k,t}$ is assumed by the following formula.

$$\Sigma_{k,t} = \sigma_k^2 I$$

In this method employing the Gaussian Mixture Modeling, it is determined to which of k (k is a positive integer) normal distributions the luminances of pixels belong. For example, four luminance normal distributions are prepared and it is determined to which of the four luminance normal distributions the luminances of pixels belong.

For example, it is determined whether the luminance $X_t$ of a certain pixel is within positive and negative ranges of $\sigma_k$ with respect to an average $\mu_k$ of a luminance normal distribution thereof. When the luminance $X_t$ is within the range, it is determined that the luminance $X_t$ belongs to the luminance normal distribution. When the luminance $X_t$ is outside the range, it is determined that the luminance $X_t$ does not belong to the luminance normal distribution. When it is determined that the luminance $X_t$ belongs to no luminance normal distribution, the luminance $X_t$ of the pixel at that point is replaced with an average $\mu$ of a luminance normal distribution having smallest weight among the k luminance normal distributions.

In this way, for each of the pixels, the weight $w_{k,t}$ of the luminance normal distributions is updated such that the weight of the luminance normal distribution to which the luminance $X_t$ belongs increases and the luminance normal distribution to which the luminance $X_t$ does not belong decreases. For example, the weight $w_{k,t}$ of the luminance normal distribution to which the luminance $X_t$ of the pixel belongs is updated according to the following formula.

$$w_{k,t} = (1-\alpha)w_{k,t-1} + \alpha$$

On the other hand, for example, the weight $w_{k,t}$ of the luminance normal distribution to which the luminance $X_t$ of the pixel does not belong is updated according to the following formula:

$$w_{k,t} = (1-\alpha)w_{k,t-1}$$

where, $\alpha$ is updating speed of the weight and is in a range of $0 \leq \alpha \leq 1$ in the updating formula of the weight $W_{k,t}$.

The average $\mu_t$ and the variance $\sigma_t$ of the luminance normal distribution are updated according to the following formulas, respectively:

$$\mu_t = (1-\rho)\mu_{t-1} + \rho X_t$$

$$\sigma_t^2 = (1-\rho)\sigma_{t-1}^2 + \rho(X_t-\mu_t)^T(X_t-\mu_t)$$

where, $\rho$ is represented by the following formula.

$$\rho = \alpha \eta(X_t | \mu_k, \sigma_k)$$

The weights of the plural luminance normal distributions are updated until the weight of a distribution equal to or larger than a fixed frame or equal to or larger than a fixed level is obtained. An average of the luminance normal distribution having the largest weight when such weight of the distribution model is obtained indicates the luminance of pixels in a stationary image portion. Therefore, when attention is paid to a change in the average of the luminance normal distribution having the largest weight, it is possible to detect, for each of the pixels, a state of a moving and stopping object while preventing the influence of a movable body as much as possible. This makes it possible to integrate detection results for the respective pixels in terms of positions and detect an immovable body as a group of image portions (see, for example, JP-A-2006-331306) (FIG. 17)).

SUMMARY OF THE INVENTION

In the Gaussian Mixture Modeling, an average, variance, and weight of luminance without a color component taken into account are used as a distribution model for one term. In such a distribution model employing only a luminance signal, it is difficult to detect objects having close luminances. Specifically, detection accuracy in an extremely bright scene, an extremely dark scene, and a scene with a small luminance change poses a problem. On the other hand, when an average, variance, and weight of a signal level are assumed for each of color components, a necessary data volume increases. As a result, a memory area and a load on a processing apparatus increase. In general, it is difficult to update an n-ary distribution model while maintaining correlation of a distribution model with each of plural color components.

Therefore, it is desirable to improve detection accuracy in movable body or immovable body detection processing employing the Gaussian Mixture Modeling.

According to an embodiment of the present invention, there is provided an image-data-distribution-model updating apparatus including: a determining unit that determines, concerning image data continuous in time series, to which of plural distribution models indicating an average of signal levels for each of plural color components, variance of a signal level distribution of all the plural color components, and reliability of all the plural color components the target image data belongs; and an updating unit that updates the average, the variance, and the reliability of a distribution model having the highest reliability among the distribution models to which it is determined that the target image data belongs and updates the reliability of the other distribution models. There is also provided a processing method and a computer program for the image-data-distribution-model updating apparatus. This brings about the action of preventing an increase in a data volume of a distribution model by consolidating the variance and the reliability while improving the detection accuracy for the plural color components using the average of the signal levels for each of the plural color components.

Preferably, the updating unit includes an average updating unit that updates, on the basis of the variance or the reliability, the average of the distribution model having the highest reliability among the distribution models to which it is determined that the target image data belongs. This brings about the action of updating an average of the distribution models.

Preferably, the updating unit includes a variance updating unit that updates, on the basis of differences between signal levels of the plural color components of the target image data and the average, the variance of the distribution model having the highest reliability among the distribution models to which it is determined that the target image data belongs. This brings about the action of updating the-variance of the distribution models.

Preferably, the updating unit includes a most-recent-reliability updating unit that updates the reliability of the plural distribution models as most recent reliability. This brings about the action of updating the most recent reliability of the distribution models.

Preferably, the updating unit includes an empirical-reliability updating unit that updates the reliability of the plural distribution models as empirical reliability. This brings about the action of updating the empirical reliability of the distribution models.

Preferably, the image-data-distribution-model updating apparatus includes an access unit that accesses, in the image data including an offset area, only an effective area excluding the offset area. This brings about the action of efficiently accessing the image data including the offset area.

According to another embodiment of the present invention, there is provided an image processing apparatus including: a determining unit that determines, concerning image data continuous in time series, to which of plural distribution models indicating an average of signal levels for each of plural color components, variance of a signal level distribution of all the plural color components, and reliability of all the plural color components the target image data belongs; an updating unit that updates the average, the variance, and the reliability of a distribution model having the highest reliability among the distribution models to which it is determined that the target image data belongs and updates the reliability of the other distribution models; and a detecting unit that detects a movable body or an immovable body in the image data on the basis of the updated distribution models. There is also provided a processing method and a computer program for the image-data-distribution-model updating apparatus. This brings about the action of preventing, when a movable body or an immovable body is detected on the basis of the distribution models, an increase in a data volume of a distribution model by consolidating the variance and the reliability while improving the detection accuracy for the plural color components using the average of the signal levels for each of the plural color components.

According to the embodiments of the present invention, it is possible to realize an excellent effect that detection accuracy in movable body or immovable body detection processing employing the Gaussian Mixture Modeling can be improved.

BRIEF DESCRIPTION OF THE DRAWINGS

FIG. 7 is a flowchart of a processing procedure example of the distribution-model updating apparatus 200 according to the embodiment;

FIG. 9 is a diagram of a content example of parameters according to the first modification of the embodiment.

DESCRIPTION OF THE PREFERRED EMBODIMENTS

Embodiments of the present invention are explained in detail below with reference to the accompanying drawings.

Figure 1:
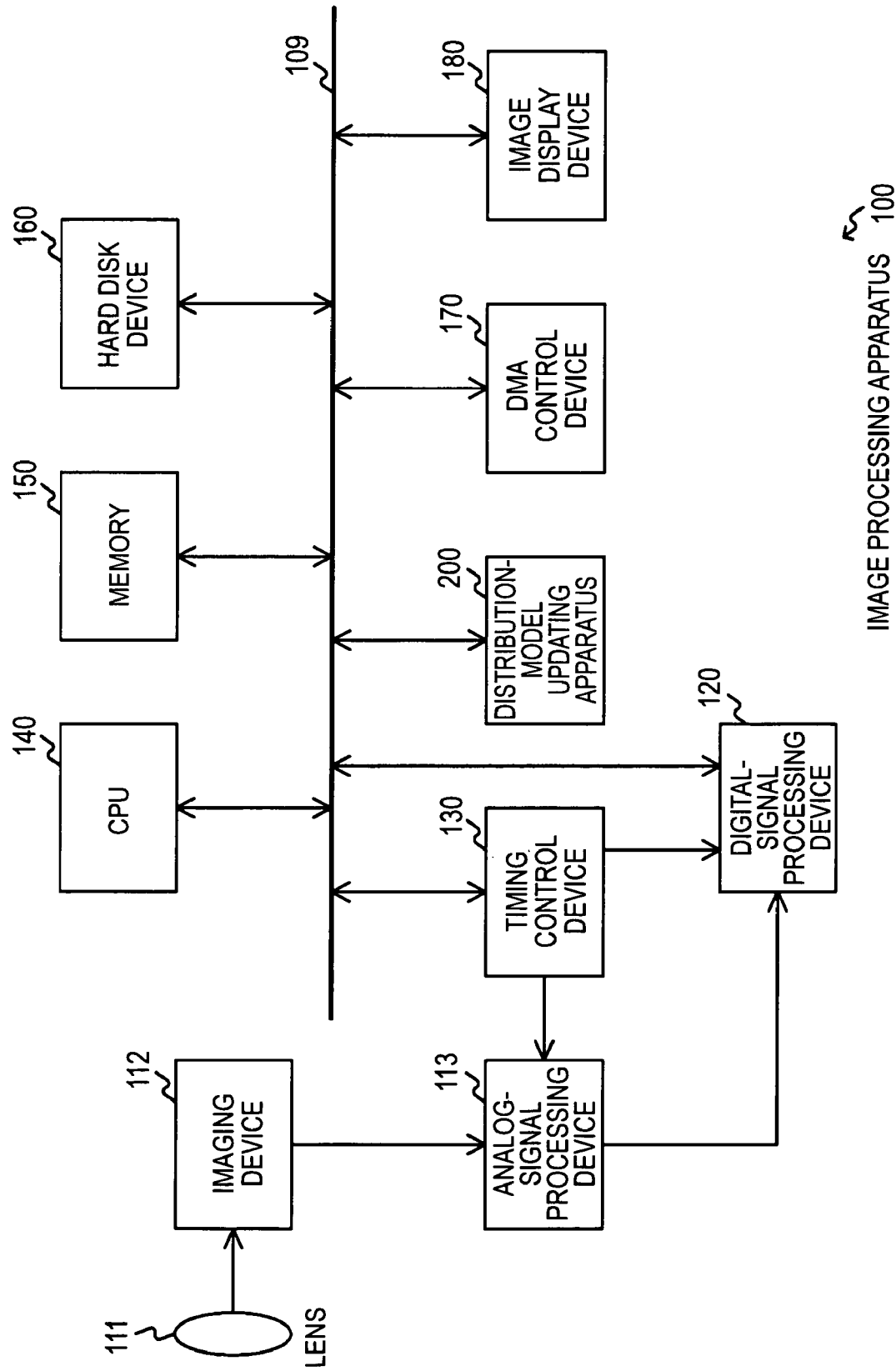
FIG. 1 is a diagram of a configuration example of an image processing apparatus 100 according to an embodiment of the present invention.

FIG. 1 is a diagram of a configuration example of an image processing apparatus 100 according to an embodiment of the present invention. The image processing apparatus 100 includes a lens 111, an imaging device 112, an analog-signal processing device 113, a digital-signal processing device 120, and a timing control device 130. The image processing apparatus 100 further includes a CPU (Central Processing Unit) 140, a memory 150, a hard disk device 160, a DMA (Direct Memory Access) control device 170, an image display device 180, and a distribution-model updating apparatus 200. The digital-signal processing apparatus 120, the timing control device 130, the CPU 140, the memory 150, the hard disk device 160, the DMA control device 170, and the image display device 180 are connected to one another by a bus 109.

The lens 111 is an optical system that condenses light from a subject. The imaging device 112 is a photoelectric conversion element that converts the light condensed by the lens 111 into an electric signal. The imaging device 112 is realized by, for example, a CCD (Charge Coupled Device) or CMOS (Complementary Metal Oxide Semiconductor) sensor.

The analog-signal processing device 113 applies analog signal processing to the electric signal photoelectrically converted by the imaging device 112. Examples of the analog signal processing include correlated double sampling (CDS) and automatic gain control (AGC). The analog-signal processing device 113 performs A/D (Analog to Digital) conversion after the analog signal processing to generate a digital signal.

The digital-signal processing device 120 applies digital signal processing to the digital signal generated by the analog-signal processing device 113. Consequently, image data continuous in time series are sequentially generated. Examples of the digital signal processing include white balance and gamma transform.

The timing control device 130 controls timing of processing in the analog-signal processing device 113 and the digital-signal processing device 120 during imaging.

The CPU 140 controls the entire image processing apparatus 100. The CPU 140 performs detection processing for a movable body or an immovable body on the basis of a distribution model updated by the distribution-model updating apparatus 200. The CPU 140 is an example of a detecting unit described in claims.

The memory 150 stores image data subjected to the digital signal processing by the digital-signal processing device 120, a work area of the CPU 140, distribution models, and the like. The hard disk device 160 records image data and the like.

The DMA control device 170 is a controller that controls DMA transfer between areas in the memory 150 or between the memory 150 and the hard disk device 160. The DMA control device 170 directly performs inter-memory transfer without the intervention of the CPU 140 according to the setting of a starting address and a transfer amount.

The image display device 180 displays image data stored in the memory 150 or the hard disk device 160. The image display device 180 is realized by, for example, an LCD (Liquid Crystal Display).

The distribution-model updating apparatus 200 updates distribution models in the Gaussian Mixture Modeling. The distribution-model updating apparatus 200 reads out image data and an update model stored in the memory 150, performs update processing for the update model, and writes the update model in the memory 150.

Figure 2:
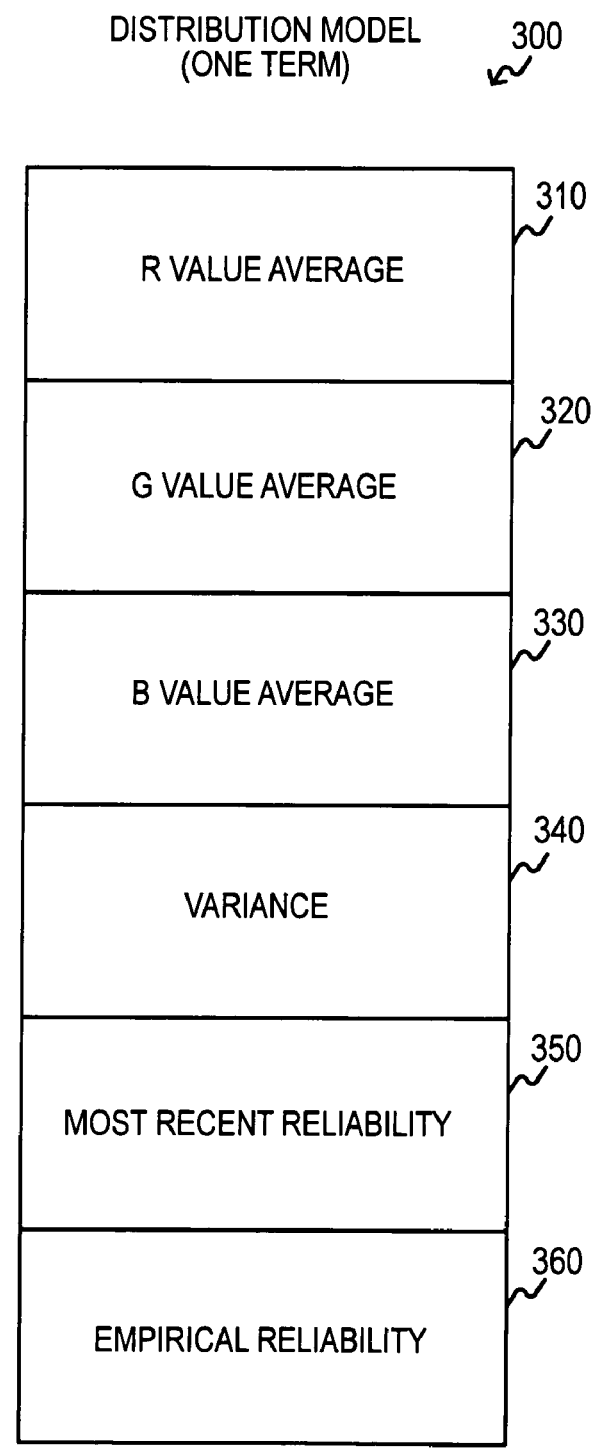
FIG. 2 is a diagram of an example of a distribution model 300 according to the embodiment.

FIG. 2 is a diagram of an example of a distribution model 300 according to this embodiment. The distribution model 300 according to this embodiment includes an R value average 310, a G value average 320, a B value average 330, variance 340, most recent reliability 350, and empirical reliability 360.

The R value average 310, the G value average 320, and the B value average 330 indicate averages of signal levels of respective plural color components. The R value average 310 indicates an average of signal levels of red (R). The G value average 320 indicates an average of signal levels of green (G). The B value average 330 indicates an average of signal levels of blue (B). Although the three colors R, G, and B are used as the color components, other color components may be used.

The variance 340 indicates the variance of a signal level distribution of all the plural color components. Specifically, the variance 340 indicates the variance with respect to image data in which the R, G, and B color components are consolidated. The averages (310 to 330) are divided for the respective color components. On the other hand, the color components are consolidated for the variance 340. This clarifies a correspondence relation between the image data and the distribution model.

As explained above, in the distribution model according to this embodiment, the averages (310 to 330) are divided for the respective color components and the color components are consolidated for the variance 340. This makes it possible to improve detection accuracy using data of the plural color components while preventing an increase in a data volume of the distribution model.

Figure 3:
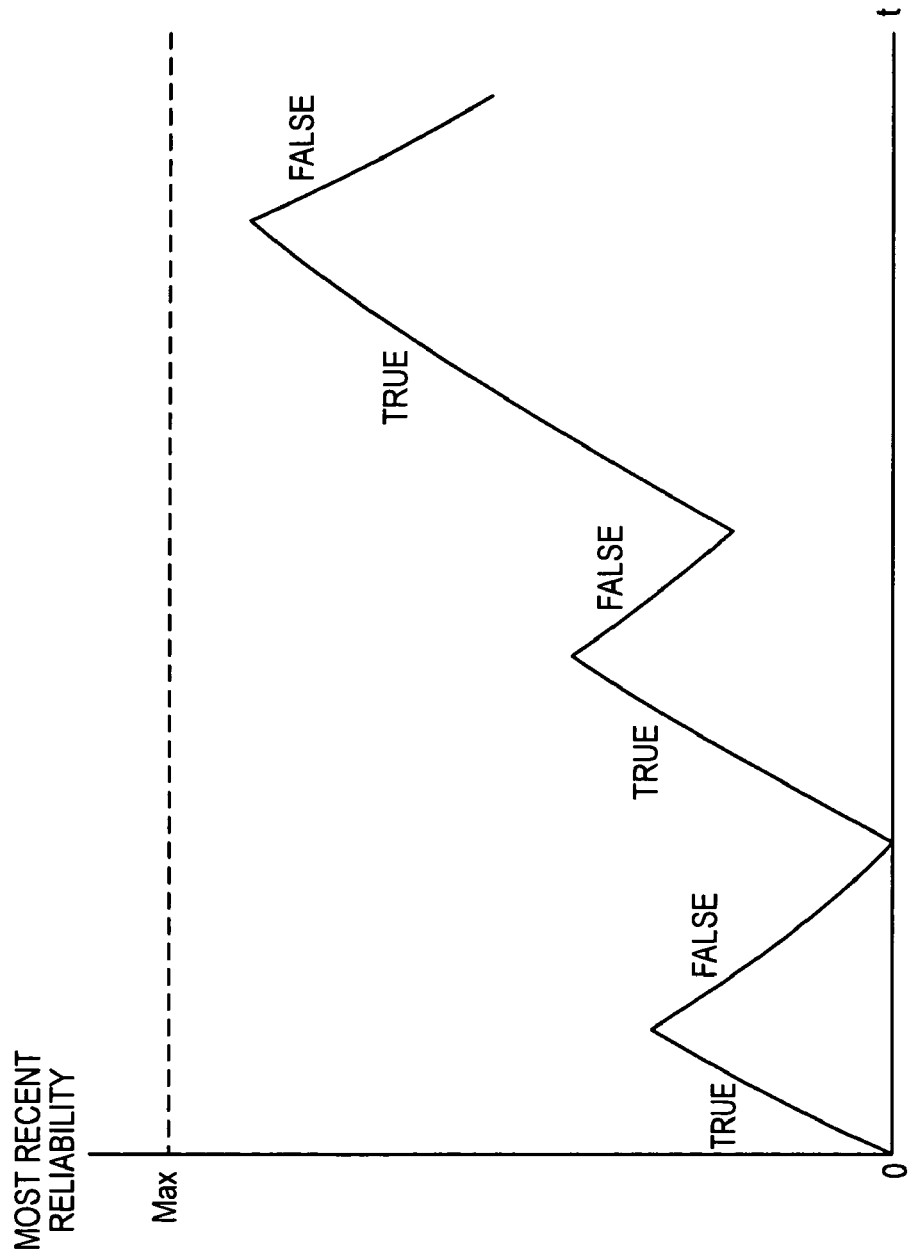
FIG. 3 is a graph of an example of most recent reliability 350 according to the embodiment.

The most recent reliability 350 indicates reliability of a most recent input dating back from the present to the past by a predetermined period. FIG. 3 is a graph of an example of the most recent reliability 350 according to this embodiment. Time t is plotted on the abscissa and the most recent reliability 350 at corresponding time is plotted on the ordinate. When it is determined that an input image is included in a distribution model, this is represented as "true". When it is determined that the input image is not included in the distribution model, this is represented as "false". In the case of "true", the most recent reliability 350 is increased according to the most recent reliability 350 at that point. However, the most recent reliability 350 does not increase to exceed a maximum Max. On the other hand, in the case of "false", the most recent reliability 350 is reduced according to the most recent reliability 350 at that point. However, the most recent reliability 350 does not fall below a minimum 0.

Figure 4:
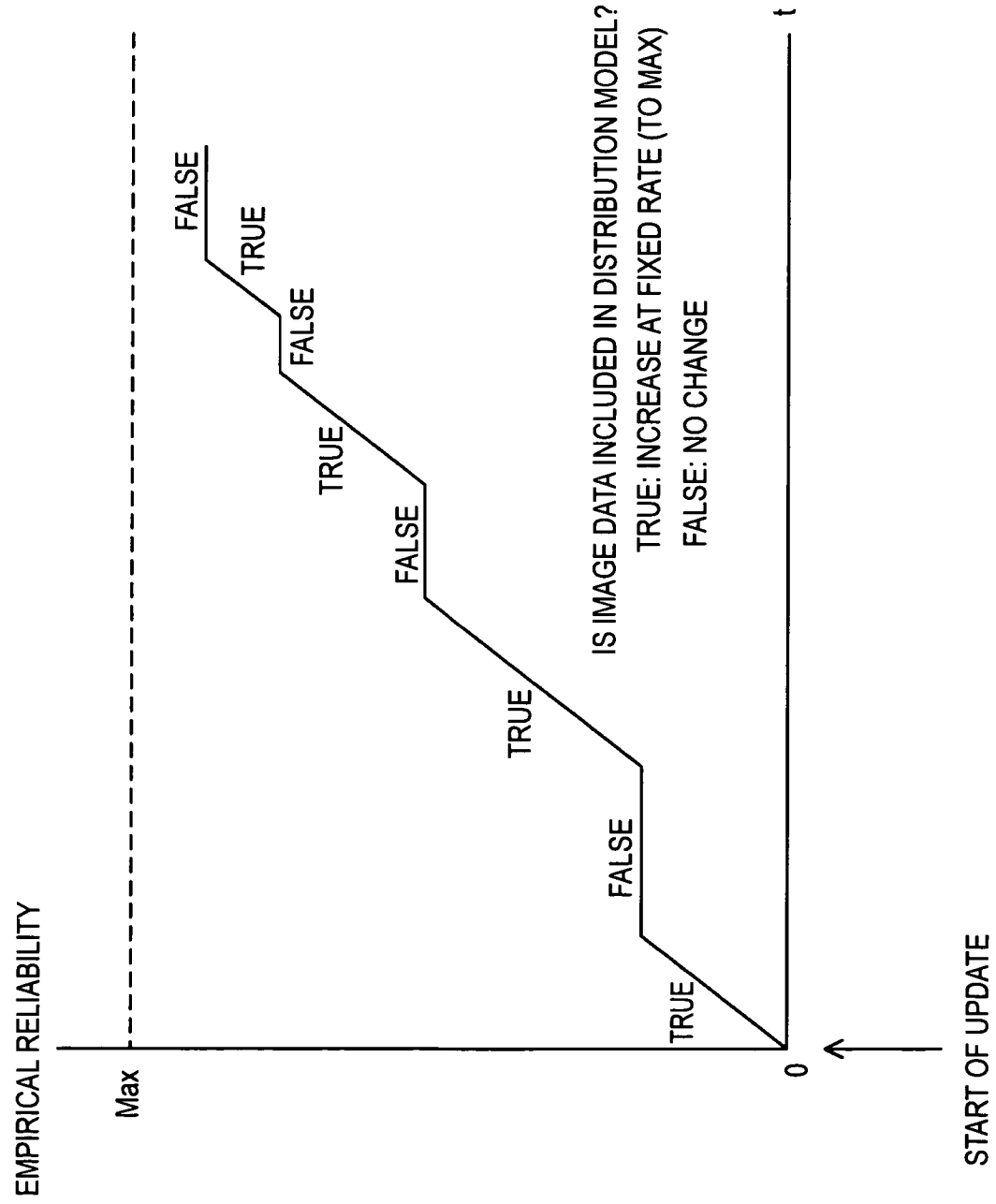
FIG. 4 is a graph of an example of empirical reliability 360 according to the embodiment.

The empirical reliability 360 indicates empirical reliability from the start of update. FIG. 4 is a graph of an example of the empirical reliability 360 according to the embodiment. Time t is plotted on the abscissa and the empirical reliability 360 at corresponding time is plotted on the ordinate. As in FIG. 3, when an input image is included in a distribution model, this is represented as "true". When the input image is not included in the distribution model, this is represented as."false". In the case of "true", the empirical reliability 360 is increased by a fixed rate or a fixed value. However, the empirical reliability 360 does not increase to exceed a maximum Max. On the other hand, in the case of "false", the empirical reliability 360 does not change. Specifically, the empirical reliability 360 monotonously increases without decreasing from the start of update.

Reliability is used for selecting, in input image data determined as being included in plural distribution models, a distribution model in which the input image data is included at a highest probability among the plural distribution models. In this embodiment, the most recent reliability 350 and the empirical reliability 360 are provided as explained above. The most recent reliability 350 is a value equivalent to "weight" explained in the Description of the Related Art and indicates a probability of inclusion of the input image in the respective distribution models calculated on the basis of inputs from the time several frames before a present frame to the resent frame. On the other hand, the empirical reliability 360 is a value obtained by counting the number of times the input image is included in the same distribution model from an update start frame to the present frame of the distribution models. Since the empirical reliability 360 does not deteriorate, the growth thereof is fast compared with the most recent reliability 350. It is possible to improve the reliability without being affected by noise. By using the empirical reliability 360, for example, when an object is temporarily placed or a movable body temporarily stops, it is possible to quickly recognize that the object or the movable body is an object that was present before. This occurs, for example, when another object is temporarily placed in front of an object present for a fixed period or a background and the temporarily placed object disappears after several frames, and the original object or the background appears again.

In the distribution model 300, the R value average 310, the G value average 320, and the B value average 330 are represented in, for example, a 11-bit fixed decimal mode. Decimal significant digits thereof are three digits. The variance 340 is represented in, for example, the 11-bit fixed decimal mode. Decimal significant digits thereof are six digits. The most recent reliability 350 is represented in, for example, the 11-bit fixed decimal mode. Decimal significant digits thereof are ten digits. The empirical reliability 360 is represented in, for example, a 9-bit fixed decimal mode. The empirical reliability 360 is an integer, decimal significant digits of which are zero digits. In this example, the number of bits per one term of the distribution model 300 is 64 bits. The empirical reliability 360 can be omitted from the distribution model 300. The distribution model 300 may include only the R value average 310, the G value average 320, the B value average 330, the variance 340, and the most recent reliability 350.

Figure 5:
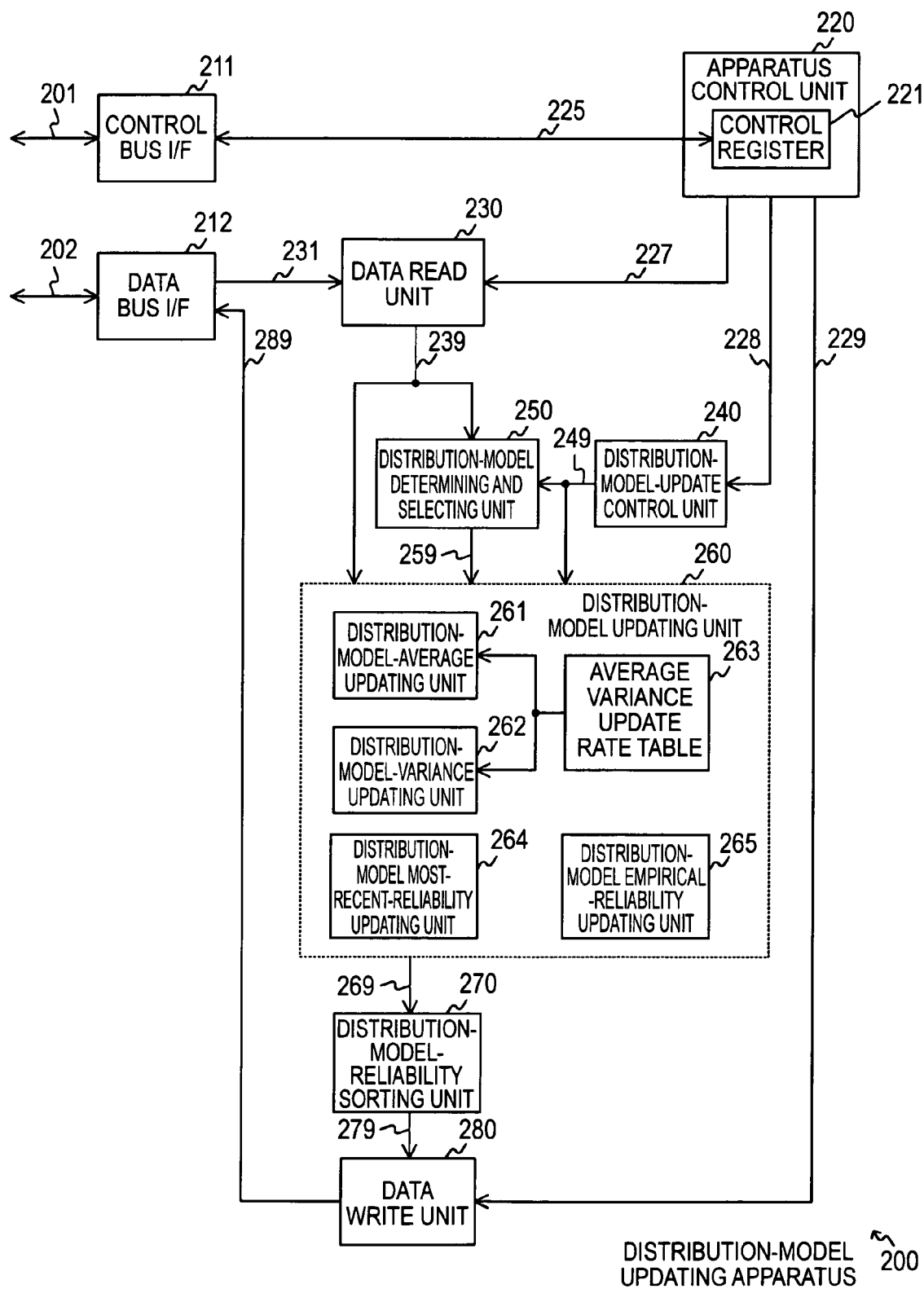
FIG. 5 is a diagram of a configuration example of a distribution-model updating apparatus 200 according to the embodiment.

FIG. 5 is a diagram of a configuration example of the distribution-model updating apparatus 200 according to this embodiment. The distribution-model updating apparatus 200 includes a control bus I/F (interface) 211, a data bus I/F 212, an apparatus control unit 220, a data read unit 230, a distribution-model-update control unit 240, and a distribution-model determining and selecting unit 250. The distribution-model updating apparatus 200 further includes a distribution-model updating unit 260, a distribution-model-reliability sorting unit 270, and a data write unit 280.

The control bus I/F 211 is an interface for exchanging data between the distribution-model updating apparatus 200 and a control bus 201 in the bus 109. The data bus I/F 212 is an interface for exchanging data between the distribution-model updating apparatus 200 and a data bus 202 in the bus 109.

The apparatus control unit 220 controls the entire distribution-model updating apparatus 200. The apparatus control unit 220 includes a control register 221 and stores control information for controlling the units of the distribution-model updating apparatus 200.

The data read unit 230 reads out image data and a distribution model from the memory 150 via the data bus I/F 212 and a signal line 231. A starting address and the number of processed pixels necessary in the readout are supplied from the apparatus control unit 220 via a signal line 227. The data read unit 230 transfers, as soon as data necessary for processing of a distribution model are collected, the data to the distribution-model determining and selecting unit 250 and the distribution-model updating unit 260 via a signal line 239.

The distribution-model-update control unit 240 performs control necessary for update of a distribution model. Parameters necessary for the update of the distribution model are supplied from the apparatus control unit 220 via a signal line 228. The distribution-model-update control unit 240 supplies the parameters to the distribution-model determining and selecting unit 250 and the distribution-model updating unit 260 via a signal line 249. Since the parameters are set by the distribution-model-update control unit 240, it is possible to switch an algorism and control parameters used for the update of the distribution model and obtain detection accuracy corresponding to a situation.

The distribution-model determining and selecting unit 250 determines whether image data is included in an n-ary distribution model and selects a distribution model having highest reliability. When it is determined that the image data is included in at least a distribution model of one term in the n-ary distribution model, the distribution-model determining and selecting unit 250 outputs index information of a distribution model having highest reliability to the distribution-model updating unit 260 via a signal line 259. On the other hand, when it is determined that image data is included in none of the distribution models, the distribution-model determining and selecting unit 250 outputs control information indicating to that effect to the distribution-model updating unit 260 via the signal line 259.

Determination on whether image data is included in a distribution model is performed according to the following determination formula.

$X=(|R$ value input$-R$ value average$|<R$ value threshold) & $(|G$ value input$-G$ value average$|<G$ value threshold) & $(|B$ value input$-B$ value average$|<B$ value threshold)

In the formula, when X is "true", this means that that image data is included in the distribution model. The R value input, the G value input, and the B value input indicate R, G, and B values of input image data. The R value average, the G value average, and the B value average indicate the R value average 310, the G value average 320, the B value average 330 of the distribution model. If a difference between an average of the distribution model and the image data is within a fixed range in all the color components of R, G, and B, it is determined that the image data is included in the distribution model.

The R value threshold, the G value threshold, and the B value threshold are different depending on a determination threshold mode. The determination threshold mode is one of the parameters supplied from the apparatus control unit 220. When the determination threshold mode is a mode A, the thresholds are represented as follows:

$R$ value threshold=variance+$R$ threshold offset $G$ value threshold=variance+$G$ threshold offset $B$ value threshold=variance+$B$ threshold offset where, the variance is the variance 340 of the distribution model. The R threshold offset, the G threshold offset, and the B threshold offset are one of the parameters supplied from the apparatus control unit 220. On the other hand, when the determination threshold mode is a mode B, the thresholds are represented as follows:

R value threshold=R threshold offset

G value threshold=G threshold offset

B value threshold=B threshold offset

Such determination is performed for each of distribution models of the n-ary distribution model. A distribution model having highest reliability is selected on the basis of a result of the determination. However, when it is determined that image data is included in none of the distribution models, control information indicating to that effect is output. Reliability used in the determination is the most recent reliability 350 or the empirical reliability 360 selected according to a reliability selection mode, which is one of the parameters supplied from the apparatus control unit 220.

The distribution-model determining and selecting unit 250 is an example of a determining unit described in claims.

The distribution-model updating unit 260 updates the n-ary distribution model and supplies a result of the update to the distribution-model-reliability sorting unit 270. Concerning the selected distribution model having highest reliability, all of the R value average 310, the G value average 320, the B value average 330, the variance 340, the most recent reliability 350, and the empirical reliability 360 are updated. On the other hand, concerning the other distribution models, only the most recent reliability 350 and the empirical reliability 360 are updated. When it is determined that image data is included in none of the distribution models, a distribution model having lowest reliability in the n-ary distribution model is updated. The initialization in this case is performed on the basis of the input image data and the parameters supplied from the apparatus control unit 220. Specifically, in the R value average 310, the G value average 320, and the B value average 330 of the distribution model to be initialized, R, G, and B values of the input image data are set as initial data, respectively. In the variance 340 and the most recent reliability 350, a variance initial value and a weight initial value given by the parameters supplied from the apparatus control unit 220 are set, respectively. In the empirical reliability 360, "1" is set as an initial value in order to indicate that there is one image data included in the distribution model. The distribution-model updating unit 260 is an example of an updating unit described in claims.

The distribution-model updating unit 260 includes a distribution-model-average updating unit 261, a distribution-model-variance updating unit 262, an average variance update rate table 263, a distribution-model most-recent-reliability updating unit 264, and a distribution-model empirical-reliability updating unit 265.

The distribution-model-average updating unit 261 updates the R value average 310, the G value average 320, and the B value average 330 of the distribution model. The update of the averages is performed according to the following formulas.

*R* value average=(*R* value input×average variance update rate)+(*R* value average×(1024−average variance update rate))

*G* value average=(*G* value input×average variance update rate)+(*G* value average×(1024−average variance update rate))

*B* value average=(*B* value input×average variance update rate)+(*B* value average×(1024−average variance update rate))

The average variance update rate is read out from the average variance update rate table 263 according to a distribution model update mode, which is one of the parameters supplied from the apparatus control unit 220. In this example, the average variance update rate is represented in the 11-digit fixed decimal mode and has ten decimal digits as significant digits. Specifically, when "1024" represented by eleven digits "1.0000000000" is a maximum of the average variance update rate, integers from 0 to 1024 are generated in the part of "1024-average variance update rate".

When the distribution model update mode is the mode A, an average variance update rate fn(σ, sub) is represented by the following formula. A Round function is a function for rounding off decimals. σ represents the variance 340, sub represents a maximum, a minimum, a median, or an average of difference absolute values between the R value input, the G value input, and the B value input and the R value average, the G value average, and the B value average. The variance σ and the difference sub take values 0 to 31. Specifically, the variance σ and the difference sub are varied to the values 0 to 31 to calculate the average variance update rate fn(σ, sub) and a value of the average variance update rate fn(σ, sub) is stored in the average variance update rate table 263. Consequently, when the distribution model is updated, it is possible to refer to the average variance update rate fn(σ, sub) by indexing the average variance update rate table 263 with the variance σ and the difference sub.

$$fn(\sigma, \text{sub}) = \text{Round}\left(\frac{1}{\sqrt{2\pi} \times \sigma} \times \exp\left(-\frac{\text{sub}^2}{2 \times \sigma^2}\right) \times 1024, 0\right)$$

On the other hand, when the distribution model update mode is the mode B, an average variance update rate fn(cnt) is represented by the following formula. A Round Down function is a function for omitting decimals. A count cnt represents the empirical reliability 360 and rate represents an update coefficient. The update coefficient rate is a coefficient for flexibly changing an update curve and is a value set by the CPU 140 during calculation of an average variance update rate. It is possible to set increase and decrease values of the average variance update rate to an appropriate value by changing the update coefficient rate. The count cnt and the update coefficient rate take values 0 to 1023. Specifically, the count cnt is varied to vales 0 to 1023 with respect to a value of set one update coefficient rate to calculate the average variance update rate fn(cnt) and a value of the average variance update rate fn(cnt) is stored in the average variance update rate table 263. Consequently, when the distribution model is updated, it is possible to refer to the average variance update rate fn(cnt) by indexing the average variance update rate table 263 with the count cnt.

$$fn(cnt) = \text{RoundDown}\left(\frac{(1024 - \text{rate}) \times \text{RoundDown}\left(\frac{1024}{cnt}, 0\right)}{1024}, 0\right) + \text{rate}$$

The two kinds of methods for calculating an average variance update rate are explained above. The average variance update rate fn (σ, sub) in the mode A is an update rate calculated by using difference values between the input image data R, G, and B and the averages R, G, and B of the distribution model and depends on a difference of input data in the present frame. As it is evident from the formula, this indicates an original characteristic of the distribution model. On the other hand, the average variance update rate fn(cnt) of the mode B is an update rate calculated by using reliability from the start of distribution model update and depends on a time axis. Therefore, this is considered to be an update rate suitable for movable body detection. It is possible to select, by appropriately using these two average variance update rates, the image difference or the time axis on which emphasis should be put to perform update of the distribution model.

The distribution-model-average updating unit 261 is an example of an average updating unit described in claims.

The distribution-model-variance updating unit 262 updates the variance 340 of the distribution model. The update of the variance is performed according to the following formula.

Variance=(difference value×average variance update rate)+(variance×(1024−average variance update rate))

The difference value is a value obtained by multiplying a value of the difference sub with a difference value scaling factor, which is one of the parameters supplied from the apparatus control unit 220. As the difference value scaling factor, for example, "1.0", "1.5", "2.0", "2.5", or "3.0" is set. It is possible to flexibly change the update curve by using the difference value scaling factor. The average variance update rate is the same as that used for the update of the average and is read out from the average variance update rate table 263 according to a distribution model update mode.

When the distribution-model-variance updating unit 262 updates the variance 340, it is desirable that a value after the update is within a range specified by a maximum and a minimum. This is because, if the variance 340 is too narrow, no pixel data corresponding to the range is present and, if the variance 340 is too wide, all pixel data correspond to the range. The distribution-model-variance updating unit 262 is an example of a variance updating unit described in claims.

The average variance update rate table 263 stores a value of the average variance update rate fn(σ, sub) or fn(cnt) in a table format. Specifically, an average variance update rate is calculated in advance by the CPU 140 and stored in the average variance update rate table 263. When the averages 310 to 330 or the variance 340 is updated, the average variance update rate table 263 is indexed with the variance σ and the difference value sub or the empirical reliability cnt set as a key. Consequently, it is possible to realize an increase in speed of processing and a reduction in a circuit area.

The distribution-model most-recent-reliability updating unit 264 updates the most recent reliability 350 of the distribution model. The update of the most recent reliability 350 is performed as explained below. First, when it is determined that image data is included in the distribution model, the most recent reliability 350 is updated as indicated by the following formula.

Most recent reliability=(most recent reliability×
(1024−reliability update rate))+reliability update
rate On the other hand, when it is determined that image data is not included in the distribution model, the most recent reliability 350 is updated as indicated by the following formula:

Most recent reliability=(most recent reliability×
(1024−reliability update rate))

In this way, the reliability of a distribution model having a highest probability including the input image data grows (increases) and the reliability of the other distribution models attenuates (decreases). The reliability update rate is one of the parameters supplied from the apparatus control unit 220. It is possible to flexibly change the update-curve by using the reliability update rate.

The distribution-model most-recent-reliability updating unit 264 is an example of a most-recent-reliability updating unit described in claims.

The distribution-model empirical-reliability updating unit 265 updates the empirical reliability 360 of the distribution model. The update of the empirical reliability 360 is performed as explained below. First, when it is determined that image data is included in the distribution model, the empirical reliability 360 is updated as indicated by the following formula.

Empirical reliability=empirical reliability+1

On the other hand, when it is determined that image data is not included in the distribution model, the empirical reliability 360 is updated as indicated by the following formula.

Empirical reliability=empirical reliability

In other words, when it is determined that image data is not included in the distribution model, the update of the empirical reliability is not performed.

The distribution-model empirical-reliability updating unit 265 is an example of an empirical-reliability updating unit described in claims.

The distribution-model-reliability sorting unit 270 sorts the n-ary distribution model in order from a distribution model having highest reliability. This sorting is performed for convenience in processing after that and is not always processing necessary in update processing. The n-ary distribution model sorted by the distribution-model-reliability sorting unit 270 is supplied to the data write unit 280. Reliability used for the sorting is a value equivalent to "weight" explained in the Description of the Related Art. In this embodiment, the reliability means the most recent reliability 350.

The data write unit 280 writes the n-ary distribution model sorted after the update in the memory 150 from the signal line 289 via the data bus I/F 212.

Figure 6:
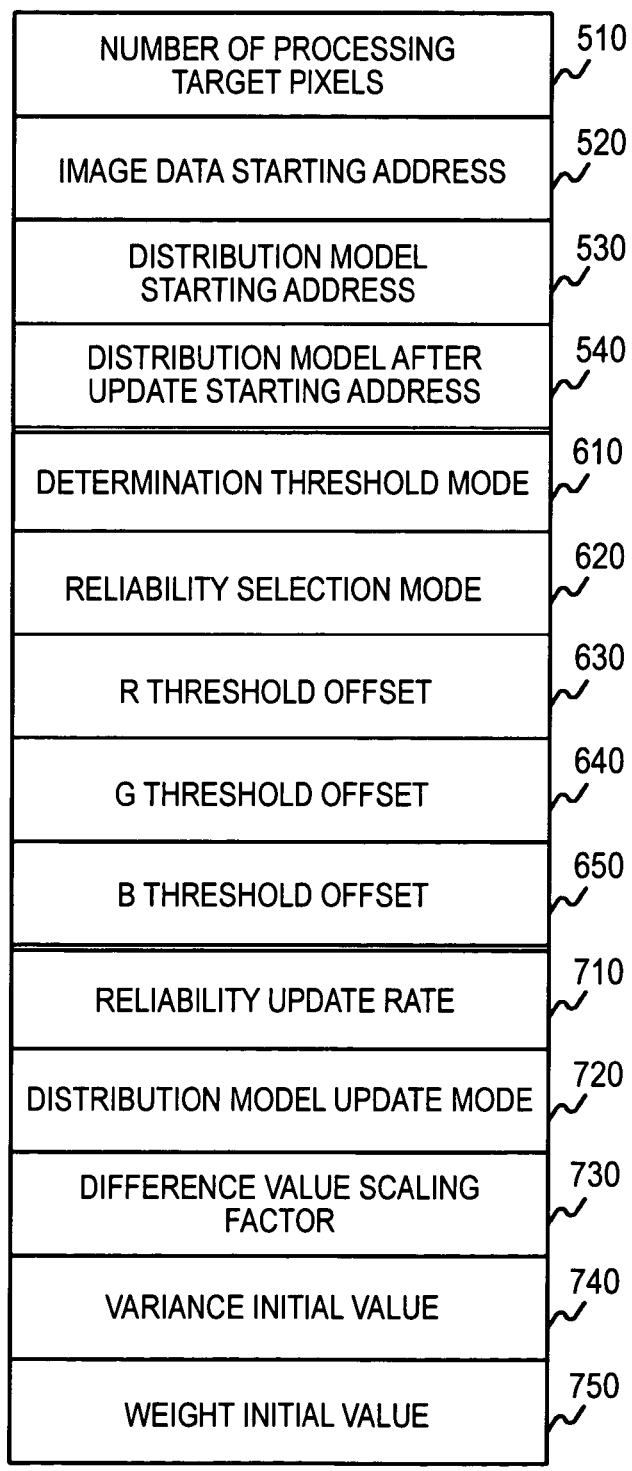
FIG. 6 is a diagram of a content example of parameters supplied from an apparatus control unit 220 according to the embodiment.

FIG. 6 is a diagram of a content example of the parameters supplied from the apparatus control unit 220 according to this embodiment. The parameters include the number of processing target pixels 510, an image data starting address 520, a distribution model starting address 530, a distribution model after update starting address 540, a determination threshold mode 610, a reliability selection mode 620, an R threshold offset 630, a G threshold offset 640, a B threshold offset 650, a reliability update rate 710, a distribution model update mode 720, a difference value scaling factor 730, a variance initial value 740, and a weight initial value 750.

The number of processing target pixels 510 indicates the number of pixels of image data to be subjected to detection processing. The image data starting address 520 indicates a starting address in the memory 150 of the image data to be subjected to the detection processing. The distribution model starting address 530 indicates a starting address in the memory 150 of the distribution model before the update. The distribution after update starting address 540 indicates a starting address in the memory 150 of the distribution model after the update.

The determination threshold mode 610 indicates a mode of a threshold used for determination of a distribution model in the distribution-model determining and selecting unit 250. In the example explained above, it is assumed that, when the determination threshold mode 610 indicates the mode A, a threshold determined by taking into account variance is used and, when the determination threshold mode 610 indicates the mode B, a threshold determined by not taking into account variance is used.

The reliability selection mode 620 indicates a mode of reliability used for selection of a distribution model in the distribution-model determining and selecting unit 250. In the example explained above, one of the most recent reliability 350 and the empirical reliability 360 is selected as reliability on the basis of the reliability selection mode 620. A distribution model, the selected reliability of which is highest, is selected.

The R threshold offset 630, the G threshold offset 640, and the B threshold offset 650 are offsets of thresholds used in determining whether image data is included in a distribution model.

The reliability update rate 710 is an update rate for updating the most recent reliability 350 of a distribution model in the distribution-model most-recent-reliability updating unit 264.

The distribution-model update mode 720 indicates a mode in updating the averages (the R value average 310, the G value average 320, and the B value average 330) or the variance 340 in the distribution model 300. As explained above, in this embodiment, the mode A or the mode B is assumed.

The difference value scaling factor 730 is a scaling factor for multiplying a value of the difference sub in order to calculate a difference value when variance is updated.

The variance initial value 740 is an initial value in initializing the variance 340 in the distribution-model updating unit 260. The weight initial value 750 is an initial value in initializing the most recent reliability 350 in the distribution-model updating unit 260.

These parameters are set in the control register 221 of the apparatus control unit 220 by the CPU 140. The parameters are supplied to the units of the distribution-model updating apparatus 200 by the apparatus control unit 220 via the signal lines 227 to 229.

FIG. 7 is a flowchart of a processing procedure example of the distribution-model updating apparatus 200 according to this embodiment. First, the CPU 140 sets parameters in the control register 221 of the apparatus control unit 220 (step S911). The data read unit 230 reads out image data and distribution model data from the memory 150 according to the parameters (step S912).

The distribution-model determining and selecting unit 250 determines whether image data is included in distribution models of the n-ary distribution model (step S913). Step S913 is an example of a determining step described in claims. When it is determined that image data is included in at least a distribution model of one term of the n-ary distribution model (step S914), the distribution-model determining and selecting unit 250 selects a distribution model having highest reliability (step S915). However, when it is determined that image data is included in none of the distribution models (step S914), the distribution-model determining and selecting unit 250 only outputs control information indicating to that effect and does not select a distribution model.

Concerning the distribution model having highest reliability, the distribution-model-average updating unit 261 updates the R value average 310, the G value average 320, and the B value average 330 (step S916). The distribution-model-variance updating unit 262 updates the variance 340 (step S917).

The distribution-model most-recent-reliability updating unit 264 updates the most recent reliability 350 of the distribution model (step S918). The distribution-model empirical-reliability updating unit 265 updates the empirical reliability 360 of the distribution model (step S919). Values after the update of the most recent reliability 350 and the empirical reliability 360 are different depending on whether it is determined that image data is included in the distribution model.

Steps S914 to S919 are an example of an updating step described in claims.

Thereafter, the distribution-model-reliability sorting unit 270 sorts the distribution models in order from one having highest reliability (step S921). The data write unit 280 writes the distribution models in the memory 150 (step S922).

According to this embodiment, since the averages (310 to 330) of the respective color components and the consolidated variance 340 are used, it is possible to improve detection accuracy while suppressing an increase in a data volume of a distribution model.

Modifications of the embodiment are explained below.

Figure 8A:
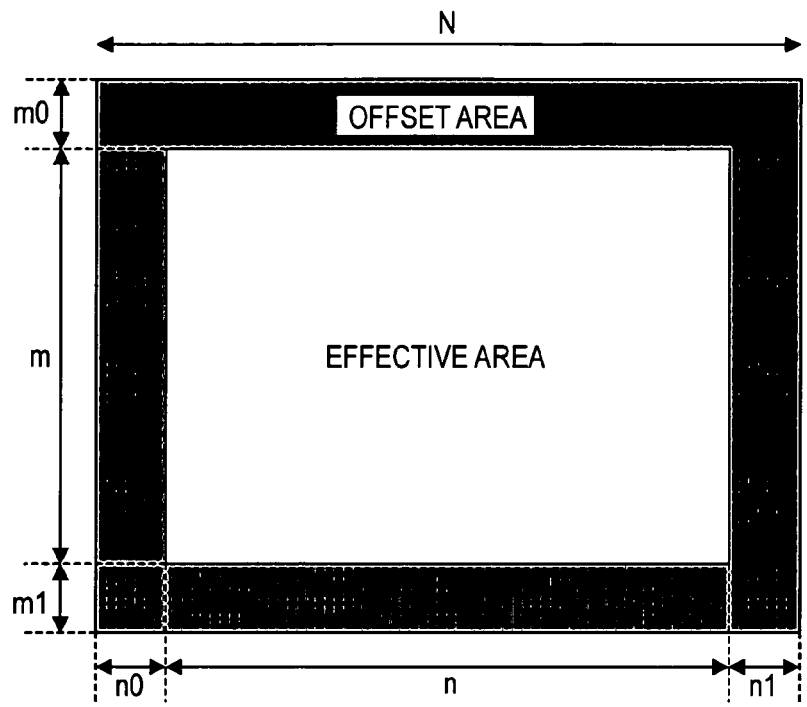
FIGS. 8A and 8B are diagrams of an image example of a memory 150 according to a first modification of the embodiment.
Figure 8B:
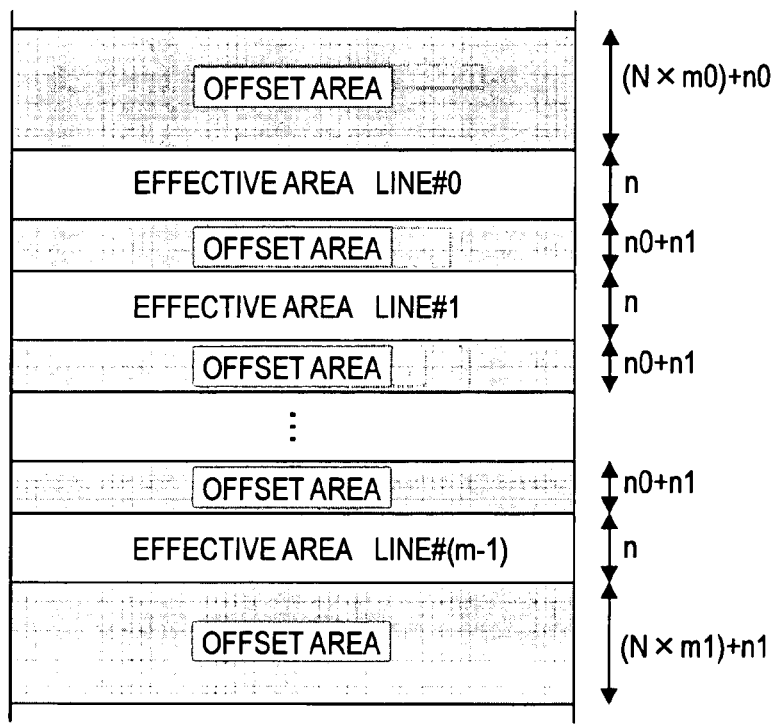

FIGS. 8A and 8B are diagrams of an image example of the memory 150 according to a first modification of the embodiment. In image data, in order to cope with a blur or the like of an image, offset areas may be provided around the image on condition that an effective area is cut out after imaging. For example, as shown in FIG. 8A, in image data including N pixels per one line, an "m0" line in an upper part and an "m1" line in a lower part are offset areas. "n0" pixels on the light side and "n1" pixels on the right side of respective lines are offset areas. An area of "n" pixels×"m" lines excluding these offset areas is an effective area of the image data.

In this case, in the memory 150, as shown in FIG. 8B, data of the offset areas and data of the effective area are alternately stored. Therefore, when the data in the memory 150 is treated without taking into account the offset areas, not only the data of the effective area, which is originally necessary, but also the data of the offset area is transferred. Therefore, in the embodiment, only the effective area in the memory 150 is accessed by taking into account the offset areas.

The data read unit 230 skips "N×m0+n0" pixels of the first offset area and accesses "n" pixels on a line #0 of the effective area. Then, the data read unit 230 skips "n0+n1" pixels in the next offset area and accesses "n" pixels on a line #1 of the effective area. The data read unit 230 repeats the skip and the access, accesses "n" pixels on a last line #(m−1) of the effective area, and ends the processing. This makes it possible to access only the data of the effective area in the memory 150.

It is possible to write only data of the effective area in the memory 150 by performing the same control in the data write unit 280.

Information concerning the offset areas in this case can be stored in the control register 221 as parameters as shown in FIG. 9. During read by the data read unit 230 and during write by the data write unit 280, access with the offset areas taken into account can be performed in the read and the write by supplying the information via the signal lines 227 and 229.

The data read unit 230 and the data write unit 280 in this modification are an example of an access unit described in claims.

FIG. 9 is a diagram of a content example of parameters according to the first modification of the embodiment. As the parameters according to the first modification, an image input offset 550, a distribution model input offset 560, and a distribution model output offset 570 are added to those shown in FIG. 6.

The image input offset 550 indicates information concerning offset areas in inputting image data in which the offset areas are provided. The distribution model input offset 560 indicates information concerning offset areas in inputting a distribution model in which the offset areas are provided. The distribution model output offset 570 indicates information concerning offset areas in outputting a distribution model in which the offset areas are provided.

As the information concerning the offset areas included in the image input offset 550, the distribution model input offset 560, and the distribution model output offset 570, respectively, five data "N", "m0", "m1", "n0", and "n1" shown in FIGS. 8A and 8B can be stored. However, since "m0" and "m1" are used as only "N×m0" and "N×m1", in order to reduce a load necessary for arithmetic processing, four data "N×m0", "N×m1", "n0", and "n1" may be stored.

Figure 10:
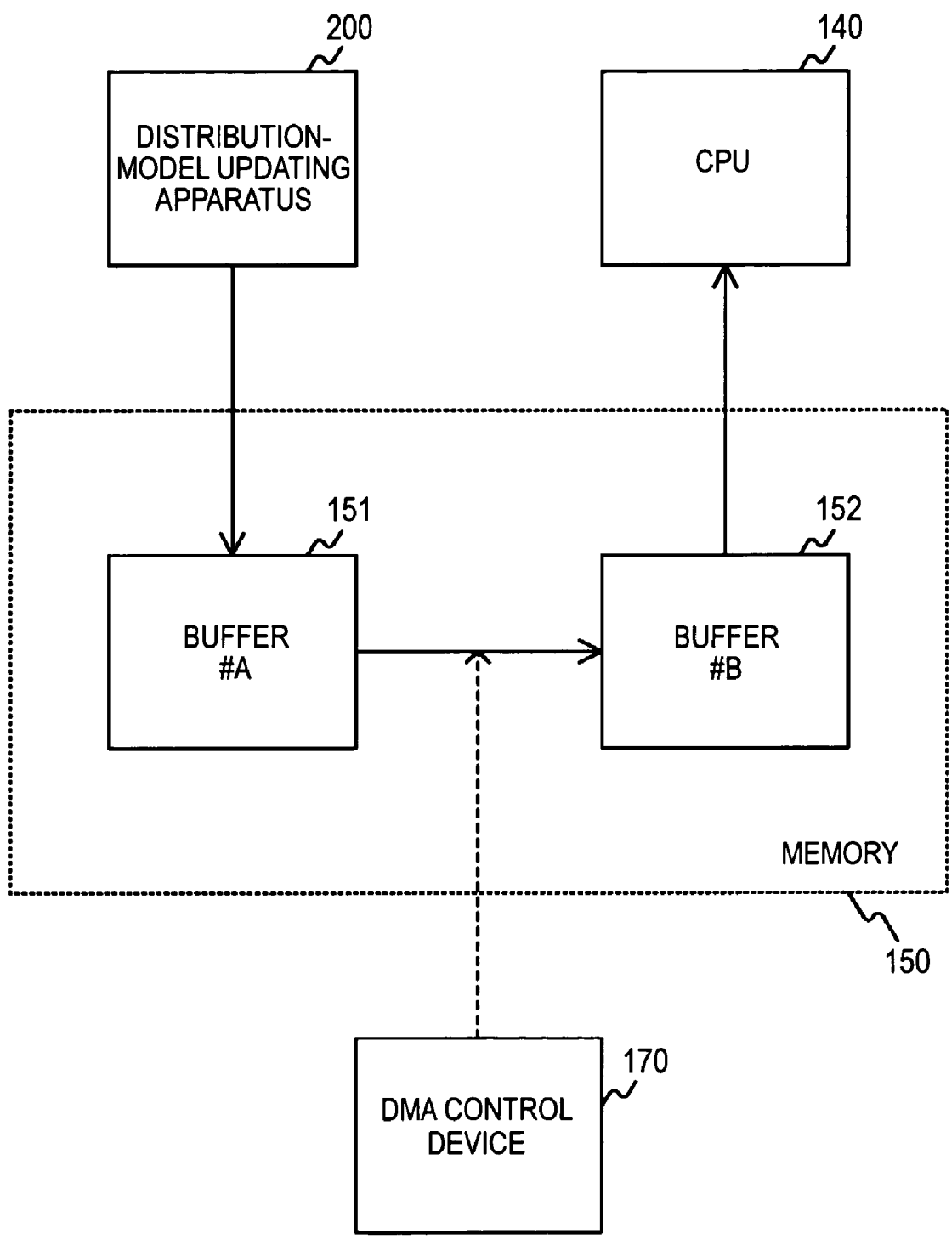
FIG. 10 is a diagram of a configuration example of a memory 150 according to a second modification of the embodiment.

FIG. 10 is a diagram of a configuration example of the memory 150 according to a second modification of the embodiment. In this example, two buffers #A151 and #B152 are provided in the memory 150. The DMA control device 170 performs transfer between the buffers #A151 and #B152.

The distribution-model updating apparatus 200 updates a distribution model using the buffer #A151. After the update of the distribution model is executed for several frames, the DMA control apparatus 170 generates, in the buffer #B152, a copy in the buffer #A151 of the distribution model. The CPU 140 performs movable body or immovable body detection processing using the distribution model generated in the buffer #B152. This makes it possible to execute the update of the distribution model by the distribution-model updating apparatus 200 and the detection processing by the CPU 140 according to pipe line control.

The distribution-model updating apparatus 200 writes updated n-ary distribution model data in an area indicated by the distribution model after update starting address 540. The update processing is performed for several frames until the reliability of the distribution model reaches a fixed level. When the reliability of the distribution model exceeds the fixed level, the CPU 140 starts detection processing using a result of the update of the n-ary distribution model and performs processing corresponding to a result of the detection. While the CPU 140 executes the detection processing, the distribution-model updating apparatus 200 performs the update of the n-ary distribution model data using the next frame image. In this way, the CPU 140 mainly performs the detection processing and the distribution-model updating apparatus 200 performs the update of the n-ary distribution model data independently from each other. This makes it possible to realize improvement of processing performance.

The embodiment indicates an example for embodying the present invention. The embodiment has a correspondence relation with the respective claimed elements in claims as explained above. However, the present invention is not limited to the embodiment. Various modifications can be applied to the embodiment without departing from the spirit of the present invention.

The processing procedures explained in the embodiment may be grasped as a method including the series of procedures or may be grasped as a computer program for causing a computer to execute the series of procedures or a recording medium that stores the computer program. As the recording medium, for example, a CD (Compact Disc), an MD (Mini Disc), a DVD (Digital Versatile Disk), a memory card, a Blu-ray Disc (registered trademark), and the like can be used.

The present application contains subject matter related to that disclosed in Japanese Priority Patent Application JP filed in the Japan Patent Office on Jul. 29, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image-data-distribution-model updating apparatus comprising:
   a determining unit that determines, concerning image data continuous in time series, to which of plural distribution models indicating an average of signal levels for each of plural color components, variance of a signal level distribution of all the plural color components, and reliability of all the plural color components the target image data belongs; and
   an updating unit that updates the average, the variance, and the reliability of a distribution model having the highest reliability among the distribution models to which it is determined that the target image data belongs and updates the reliability of the other distribution models.

2. An image-data-distribution-model updating apparatus according to claim 1, wherein the updating unit includes an average updating unit that updates, on the basis of the variance or the reliability, the average of the distribution model having the highest reliability among the distribution models to which it is determined that the target image data belongs.

3. An image-data-distribution-model updating apparatus according to claim 1, wherein the updating unit includes a variance updating unit that updates, on the basis of differences between signal levels of the plural color components of the target image data and the average, the variance of the distribution model having the highest reliability among the distribution models to which it is determined that the target image data belongs.

4. An image-data-distribution-model updating apparatus according to claim 1, wherein the updating unit includes a most-recent-reliability updating unit that updates the reliability of the plural distribution models as most recent reliability.

5. An image-data-distribution-model updating apparatus according to claim 1, wherein the updating unit includes an empirical-reliability updating unit that updates the reliability of the plural distribution models as empirical reliability.

6. An image-data-distribution-model updating apparatus according to claim 1, wherein the image-data-distribution-model updating apparatus includes an access unit that accesses, in the image data including an offset area, only an effective area excluding the offset area.

7. An image processing apparatus comprising:
   a determining unit that determines, concerning image data continuous in time series, to which of plural distribution models indicating an average of signal levels for each of plural color components, variance of a signal level distribution of all the plural color components, and reliability of all the plural color components the target image data belongs;
   an updating unit that updates the average, the variance, and the reliability of a distribution model having the highest reliability among the distribution models to which it is determined that the target image data belongs and updates the reliability of the other distribution models; and
   a detecting unit that detects a movable body or an immovable body in the image data on the basis of the updated distribution models.

8. An image-data-distribution-model updating method comprising the steps of:
   determining, concerning image data continuous in time series, to which of plural distribution models indicating an average of signal levels for each of plural color components, variance of a signal level distribution of all the plural color components, and reliability of all the plural color components the target image data belongs; and
   updating the average, the variance, and the reliability of a distribution model having the highest reliability among the distribution models to which it is determined that the target image data belongs and updating the reliability of the other distribution models.

9. A non-transitory computer-readable medium having stored thereon a program code for causing a computer to execute operations comprising:
   a determining step of determining, concerning image data continuous in time series, to which of plural distribution models indicating an average of signal levels for each of plural color components, variance of a signal level distribution of all the plural color components, and reliability of all the plural color components the target image data belongs; and
   an updating step of updating the average, the variance, and the reliability of a distribution model having the highest reliability among the distribution models to which it is determined that the target image data belongs and updating the reliability of the other distribution models.

* * * * *